(12) United States Patent
Mamakhel et al.

(10) Patent No.: US 7,807,124 B2
(45) Date of Patent: Oct. 5, 2010

(54) CARBON NITRIDE PREPARATION METHOD

(75) Inventors: Mohammad Aref Hasan Mamakhel, Galten (DK); Sergej Nicolaevich Philippov, St. Petersburg (RU); Reijo Lappalainen, Hiltulanlahti (FI)

(73) Assignee: Carbodeon Ltd. Oy (FI)

( * ) Notice: Subject to any disclaimer, the term of this patent is extended or adjusted under 35 U.S.C. 154(b) by 0 days.

(21) Appl. No.: 12/307,959

(22) PCT Filed: Jul. 13, 2007

(86) PCT No.: PCT/FI2007/000192

§ 371 (c)(1),
(2), (4) Date: Jun. 9, 2009

(87) PCT Pub. No.: WO2008/006935

PCT Pub. Date: Jan. 17, 2008

(65) Prior Publication Data

US 2010/0015030 A1    Jan. 21, 2010

(30) Foreign Application Priority Data

Jul. 13, 2006    (FI)    .................. 20060682

(51) Int. Cl.
*C01B 21/082* (2006.01)
(52) U.S. Cl. .................................... 423/384
(58) Field of Classification Search ............. 423/364, 423/384
See application file for complete search history.

(56) References Cited

U.S. PATENT DOCUMENTS

| | | | | |
|---|---|---|---|---|
| 3,953,577 A | * | 4/1976 | Ooka et al. | ................. 423/236 |
| 3,956,460 A | * | 5/1976 | Brocoff | ..................... 423/221 |
| 4,205,103 A | * | 5/1980 | Davis et al. | ................. 427/373 |
| 4,832,930 A | * | 5/1989 | Tekatch et al. | ............. 423/356 |
| 5,215,728 A | * | 6/1993 | McManus | .................... 423/220 |
| 5,606,056 A | | 2/1997 | Kouvetakis et al. | |
| 5,981,094 A | | 11/1999 | Teter et al. | |
| 6,428,762 B1 | | 8/2002 | Khabashesku et al. | |
| 6,627,670 B2 | * | 9/2003 | Mork et al. | .................... 521/65 |
| 2003/0157351 A1 | | 8/2003 | Swatlaski et al. | |
| 2006/0281929 A1 | * | 12/2006 | Okamoto et al. | ............. 549/240 |

FOREIGN PATENT DOCUMENTS

JP    57-22116 A    *    2/1982

(Continued)

OTHER PUBLICATIONS

Komatsu et al., "Polycondensation/pyrolysis of tris-s-triazine derivatives leading to graphite-like carbon nitrides," 2001, Journal of Materials Chemistry, 11, pp. 474-478.*

(Continued)

*Primary Examiner*—Wayne Langel
*Assistant Examiner*—Brittany M Martinez
(74) *Attorney, Agent, or Firm*—Cantor Colburn LLP

(57) ABSTRACT

The present invention relates to a method for preparing carbon nitride material wherein organic rodanide is simply pyrolyzed to give carbon nitride material in an efficient, economical, and ecologically friendly manner. The present invention accomplishes preparation of graphitic carbon nitride materials having a carbon to nitrogen molar ratio of about 3:4. The employed starting materials are cheap and can be easily removed and/or washed away.

24 Claims, 1 Drawing Sheet

FOREIGN PATENT DOCUMENTS

| | | | | |
|---|---|---|---|---|
| JP | 59-169914 | A | * | 9/1984 |
| SU | 783263 | B | * | 11/1980 |
| SU | 282303 | A | * | 9/1985 |
| SU | 339143 | A1 | * | 10/1991 |
| WO | 2006/087411 | A1 | | 8/2006 |
| WO | 2008/006935 | A2 | | 1/2008 |

OTHER PUBLICATIONS

Miller et al., "Synthesis and Structure of 2,5,8-Triazido-s-Heptazine: An Energetic and Luminescent Precursor to Nitrogen-Rich Carbon Nitrides," 2004, J. Am. Chem. Soc., 126, pp. 5372-5373.*

International Search Report; International Application No. PCT/FI2007/000192; International Filing Date Jul. 13, 2007; Date of Mailing of International Search Report Feb. 29, 2008 (3 pages).

Andrew P. Purdy and John H. Callahan, Synthesis of Sublimable Carbon Nitride Materials, Main Group Chemistry, 1998, vol. 2, pp. 207-213.

Mohammad Arif et al., Preparation of Powdered Carbon Nitride $C_3N_4$, Glass Physics and Chemistry, vol. 30, No. 6, 2004, pp. 573-575.

Montigaud et al., $C_3N_4$: Dream or reality? Solvothermal synthesis as macroscopic samples of the $C_3N_4$ graphitic form, Journal of Materials Science 35 (2000) 2547-2552.

Dale R. Miller et al., Rapid, facile synthesis of nitrogen-rich carbon nitride powders, J. Mater. Chem., 2002, 12, 2463-2469.

XP-002467364, Abstract, 1 page, 2001.

DE 10344015 A1, Abstract 1 page, Apr. 7, 2005.

Hu et al., Nitrogen-driven sp3 to sp2 transformation in carbon nitride materials, Physical Review B, 1997, vol. 57, No. 6, pp. 3185-3188, Abstract 1 page.

Widlow et al., Recent Progress in the synthesis and characterization of amorphous and crystalline carbon nitride coatings, Brazilian Journal of Physics, 2000, vol. 30, No. 3.

Tien-Rong Lu et al., Thin Solid Films, 1997, vol. 308-309, pp. 126-129, Abstract 1 page.

* cited by examiner

US 7,807,124 B2

CARBON NITRIDE PREPARATION METHOD

CROSS REFERENCE TO RELATED APPLICATIONS

This is a U.S. national stage of application No. PCT/FI2007/000192, filed on 13 Jul. 2007. Priority under 35 U.S.C. §119(a) and 35 U.S.C. §365(b) is claimed from Finland Patent Application No. 20060682, filed 13 Jul. 2006, the disclosure of which is also incorporated herein by reference.

FIELD OF THE INVENTION

This invention relates to a method for preparing graphitic carbon nitride materials having a carbon to nitrogen molar ratio of about 3:4 by pyrolyzing non-metallic rhodanides in a simple and economically feasible manner. Prepared carbon nitride materials have outstanding properties and can be used in applications such as wear and corrosion resistant coatings, electronics, optical coatings and in various composite materials.

STATE OF THE ART

Carbon nitride materials have been the focus of considerable experimental and theoretical attention since Cohen and co-workers proposed that $\beta$-$C_3N_4$, a carbon nitride material analogous to $\beta$-$Si_3N_4$, should have hardness comparable to that of diamond. Subsequent calculations have shown that other crystalline $C_3N_4$ should have stabilities comparable or greater to that of $\beta$-$C_3N_4$, and that many of these structures should be hard by nature. The $C_3N_4$ structures include $\alpha$-, $\beta$-, cubic-, pseudocubic-, and graphitic carbon nitride. Additionally, $C_2N_2$, although possessing a different chemical structure, is called carbon nitride.

The local structure property that distinguishes potentially super hard and dense $C_3N_4$ structures from low-density, softer material is carbon coordination: hard materials require tetrahedral or $sp^3$-bonded carbon in the $C_3N_4$-network, while $sp^2$-bonded carbon will lead to much softer materials. This requirement of having $sp^3$-bonded carbon in a hard carbon nitride is completely analogous to that in amorphous diamondlike carbon (DLC), Hu et al., "Nitrogen-driven sp3 to sp2 transformation in carbon nitride materials", *Physical Review B*, 1997, volume 57, number 6, pages 3185-3188.

As for various diamond coatings, carbon nitride coatings possess excellent wear- and scratch-free properties. Additionally, carbon nitride materials are corrosion resistant and can act as electrical insulators, optical coatings, and above all, they possess remarkably better thermal resistance than obtained with corresponding DLC-coatings.

Although good results in various coating/thin film applications can already be achieved with amorphous $CN_x$ structures, the properties are overly enhanced once the nitrogen content and thus, the crystallinity in the carbon nitride are realized in the thin film/coating structure.

In general, the present industrially produced carbon nitride coatings/thin films are amorphous with nitrogen content less than 50%, i.e., not $C_3N_4$ structures.

Due to their easier availability, the amorphous $CN_x$ materials have already found a wide spread of applications. It is for instance the most widely used material in protective overcoats for hard disks, Widlow et al., "Recent Progress in the synthesis and characterization of amorphous and crystalline carbon nitride coatings", *Brazilian Journal of Physics*, 2000, volume 30, number 3. Such films are generally produced by various film deposition methods by ablating graphite in pure nitrogen, the resulting films comprising amorphous carbon nitride having wear performance several times better than existing coatings.

The other efforts to produce carbon nitride coatings/thin films have been done by laser ablation, inductively coupled plasma chemical vapor deposition, solvothermal method as well as electrodeposition from organic liquid. In the majority of the reports, the nucleation and growth of amorphous $CN_x$ thin solid films takes place. In general, the materials produced in these studies have been amorphous with nitrogen content less than 50%, i.e., not $C_3N_4$ structures.

To increase the nitrogen content and the degree of crystallinity in carbon nitride films by above mentioned film deposition techniques, there have been tremendous attempts to prepare nitrogen-rich carbon nitride materials in powder form. Preferably, such precursor materials would naturally possess carbon:nitrogen ratio of 3:4 and carbon-nitrogen bonding similar to that of $C_3N_4$ carbon nitride materials in general.

At present, there is an actual interest in methods of production of carbon nitride by thermochemical decomposition (pyrolysis) of chemical substances or mixtures.

There is a known method of $C_3N_4$ production, which includes loading of melamine $(C_3N_3)(NH_2)_3$ and cyanuric chloride $(C_3N_3)Cl_3$ into a reactor with further heating and generation of the end product $C_3N_4$.

The drawback of the abovementioned method is the fact that the method does not allow to prevent the formation of $H_2$ and HCN as by-products. This results in an elevated explosiveness and toxicity of the process; H. Montigaud, B. Tanguy, G. Demazeau, I. Alves, S. Courjault, "$C_3N_4$: dream or reality? Solvothermal synthesis as macroscopic samples of $C_3N_4$ graphitic form", *J. of Materials Science*, 2000, volume 35, pages 2547-2552.

There is also a known method of synthesis of carbon nitride $C_3N_4$. U.S. Pat. No. 6,428,762. Powder of cyanuric chloride $(C_3N_3)Cl_3$ is mixed with powder of lithium nitride $Li_3N$, after which the mixture is placed in a reactor and sealed. Nitrogen flow is put through the reactor; the contents are heated up to 300-400° C. and incubated for a certain period of time. In order to remove any byproducts, the ready made carbon nitride is cooled down and washed.

The drawbacks of the indicated method are: the process is multistage, is of high cost and gives a low yield of the end product, $C_3N_4$.

There is also a known method of $C_3N_4$ production, taken here as a prototype. Dale R. Miller, Jianjun Wang, Edward G. Rapid, "facile synthesis of nitrogen-rich carbon nitride powders", *J. Mater. Chem.*, 2002, volume 12, pages 2463-2469. The method includes loading of trichloromela mine $(C_3N_3)(NHCl)_3$ into a reaction chamber, after which inert conditions are ensured by a continuous flow of $N_2$ or Ar, and in the flow of this gas environment the heating up to T=500° C. is carried out. There takes place a decomposition of $(C_3N_3)(NHCl)_3 \rightarrow C_3N_{4+x}+3HCl+(2-x)/2N_2$ with generation of $C_3N_{4+x}$, where $0.5 \leq x \leq 0.8$. The gaseous by-products HCl and $N_2$ are removed with the flow of the inert gas in the (reaction) chamber. After that, the chamber is cooled down for 10 minutes, the end-product is washed with acetone and then dried at T=130° C. The method does not allow obtaining $C_3N_4$ of stoichiometric composition. Moreover, it is not possible to completely remove traces of hydrogen, chlorine, and oxygen from carbon nitride.

UV photo-assisted synthesis has been employed to prepare a carbon nitride target by reacting an alkali-metal amide, such as sodium amide, as a nitrogen source with an alkyl chloride, such as chloroform, as carbon source; Tien-Rong Lu, Cheng- Tzu Kuo, Teng-Ming Chen, *Thin Solid Films*, 1997, volume 308-309, pages 126-129. The reaction involves steps of decomposing the unreacted starting materials by series of pumping and filtration processes, and a tedious process to remove alkali chloride by-product. The powder material is then sintered at 800° C. to yield the target material containing C, N, and H, the nitrogen to carbon ratio being still only 0.23.

RU2005104194 and PCT/FI2006/000040 by Lappalainen et al. describe a feasible way of producing carbon nitride ($C_3N_4$) material by pyrolyzing alkali metal rhodanides in a controlled manner. However, the process is limited to only alkali metal derived starting materials, non-metallic rhodanides such as ammonium rhodanide being thus excluded.

SUMMARY OF THE INVENTION

The major drawbacks of the known methods for preparing are that they are costly, hazardous processes often comprising several reaction sequences with moderate end-product yields, with carbon:nitrogen ratios far from the desired ratio of 3:4. Moreover, the byproducts are difficult to remove and the washing processes are ineffective and time-consuming. For example when employing alkali metal rhodanides in the production of carbon nitride materials, formation of various alkali metal salts easily remaining in the carbon nitride product itself takes place. Such impurities generally have a negative effect in the product applications.

The present appropriate starting materials are very limited in scope.

The present invention now resolves the problems mentioned above.

The invention relates to a method for preparing carbon nitride materials by pyrolyzing non-metallic rhodanides to give carbon nitride materials having a carbon to nitrogen ratio of about 3:4 in a simple and economically feasible manner. The method produces graphitic carbon nitride materials that can in turn be employed for preparing carbon nitride material in different chemical and structural forms including but not limited to α-, β-, cubic-, pseudocubic-, graphitic- and amorphous forms of $C_3N_4$.

The carbon nitride materials have outstanding properties and can be used in applications such as wear and corrosion resistant coatings, electronics, optical coatings and in various composite materials to improve the properties of for example metal-, glass- and polymer-derived products. The carbon nitride materials can be used as additives, for example as composites in metals, metal alloys, different kinds of polymer products as well as glass products. They can be used in manufacturing of electronics and semiconductors, manufacturing of household machinery and medical equipment, drilling, grinding and polishing products, in production of blue luminophore, in spray coating of computer hard disc, manufacturing of heavy duty tools used in metal processing, as solar cell materials etc. Further, graphitic carbon nitride can be employed as a fuel cell material and as a lubricant for difficult conditions. Since carbon nitride is both thermally and chemically very stable, it will, if available in quantitative volumes, be utilized in many new applications such as coating chemical process apparatus, creep-strengthening, and improving wear and/or hardness properties of different metal grades for different purposes etc. One representative problem is for example creeping of copper materials when preserving nuclear waste for multimillenium time-frames.

Surprisingly we also found that non-metallic rhodanides such as ammonium rhodanide can be employed efficiently and in economically efficient way in preparation of carbon nitride by simply pyrolyzing said rhodanides. Even when compared to pyrolyzing alkali metal rhodanides, the yields are increased and the production costs are decreased further. Since no alkali metal or metal traces are formed in the reaction, the product can now be obtained without tedious washing sequences to remove said side-products. If present, such side-products would have a seriously negative effect in the product applications.

Compared to most of the known production methods, the production cost can be lowered by factor of 10-20 via using relatively cheap raw material and raising the yield of the ready-made end product. There is provided an actual manufacturing method for quantitative production of carbon nitride materials in particle form.

As with alkali metal rhodanides, the use of organic metal rhodanide leads according to equation $4MeCNS \rightarrow 2Me_2S + C_3N_4 + CS_2$ to generation of carbon nitride $C_3N_4$ of stoichiometric composition and impurities, which do not contain toxic HCN, with the temperature gradient ensuring complete decomposition of the furnace charge and condensation of $CS_2$. Organicsulfides, which are co-produced in the reaction process, are well dissolved in water, which ensures the production of pure graphitic carbon nitride material. It was found, that by varying the temperature ramp rates and soak or annealing times of furnace charge it is possible to obtain various compositions of graphitic carbon nitride materials. As the overall size of the $C_3N_4$ polymeric structure increases, the hydrogen content decreases and C:N ratio approaches 3:4.

The pyrolysis is advantageously carried out in a reactor chamber which is built of at least two connected and sealed vessels in shape. Such features allow for making the reaction process in a closed volume, which makes the whole process ecologically-friendly, ensures the high purity and the quick removal of any by-products and reduction of the $C_3N_4$ production costs. The process is easily up-scaleable and due to relative harmless chemicals, several different reactor materials can be employed in the manufacturing apparatus. This in turn further reduces the overall manufacturing cost.

BRIEF DESCRIPTION OF THE FIGURES

The enclosed figures represent some possible reactor vessel arrangements for preparing carbon nitride material.

DETAILED DESCRIPTION OF THE INVENTION

Figure 1A:
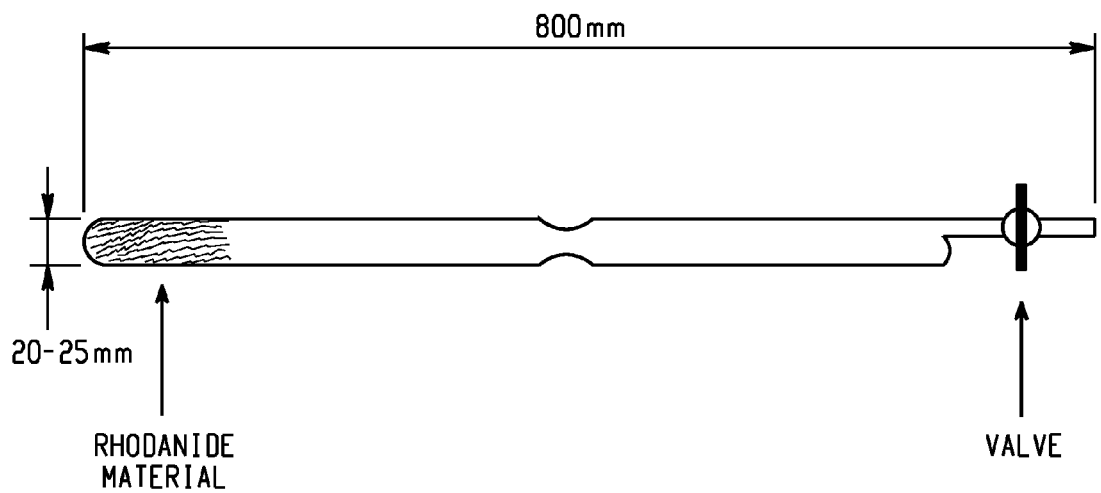
FIG. 1a represents one possible embodiment of a reactor vessel arrangement for preparing carbon nitride material.

The present invention is directed to a method for preparing carbon nitride material, wherein organic rhodanide is pyrolyzed to give carbon nitride material. As used herein, "pyrolysis" means decomposition or transformation of a compound caused by heat. As used herein, "rhodanides" means thiocyanate/isothiocyanate (SCN; CNS) compounds. As used herein, "carbon nitride materials" means different $CN_x$, $C_2N_2$ and, especially $C_3N_4$ materials. As used herein, "organic" means all non-metallic compounds, also those not containing carbon in the molecular skeleton. As used herein, "metals" means all kinds of metals, including alkali metals.

The method according to the invention enables use of all kind of non-metallic rhodanides in preparation of carbon nitride materials. An especially preferred non-metallic rhodanide is ammonium rhodanide, $NH_4SCN$. The rhodanides can be employed alone or as mixtures. In order to increase the production rate and/or fine tune the product structural composition, the reaction can be catalyzed with appropriate catalysts. A non-limiting example is zinc-derived catalysts, such as zinc chloride.

The pyrolysis is preferably carried out in the substantial absence of oxygen and/or hydrogen. Most preferably, the pyrolysis is carried out in complete absence of oxygen and/or hydrogen. The presence of oxygen dramatically lowers the yield of the product, and hydrogen increases the risk of explosions.

In one preferred embodiment of the invention, such conditions can be achieved by carrying out the pyrolysis under vacuum. When carrying out the pyrolysis under vacuum, the pressure can be $10^{-1}$-$10^{-9}$ mmHg, preferably $10^{-3}$-$10^{-7}$ mmHg, and most preferably $10^{-4}$-$10^{-6}$ mmHg, possibly using inert gas flow to remove gaseous impurities.

In another preferred embodiment of the invention, the pyrolysis of organic rhodanide or rhodanides is carried out under a high purity inert gas atmosphere. Preferably, such inert atmospheres comprise nitrogen, helium, or argon.

In one preferred embodiment of the invention the pyrolysis is carried out with a gradient of $T_{max} \leq 850°$ C., $T_{min} \leq$ ambient temperature. In a second preferred embodiment of the invention, the pyrolysis is carried out with a gradient of $T_{max} \leq 650°$ C., $T_{min} \leq$ ambient temperature. In a still another preferred embodiment of the invention, the pyrolysis is carried out with a gradient of $T_{max} \leq 500°$ C., $T_{min} \leq$ ambient temperature. In some cases, raising the temperature over 500° C. is not justifiable, as it may lead to partial decomposing of $C_3N_4$, thus lowering the yield of the product. Different starting materials act differently, and different temperatures can typically yield different structures of carbon nitride materials. The polymer size and thus the exact hydrogen content and C:N ratio of the product compound can be tuned by employing different temperatures. Therefore, the scope of the invention is not restricted to said temperature gradient.

Figure 1B:
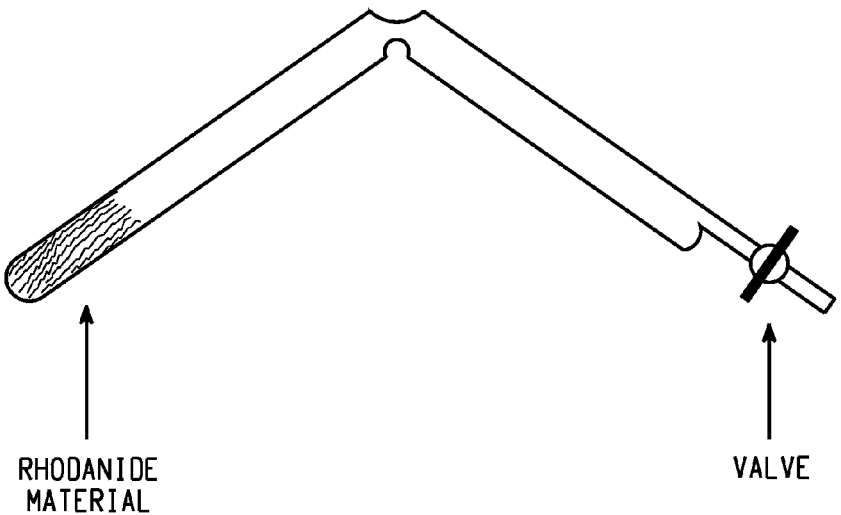
FIG. 1b represents one possible embodiment of a reactor vessel arrangement for preparing carbon nitride material.

In one preferred embodiment of the invention, the temperature gradient is created essentially throughout the chamber. As used herein, "chamber" means a reactor, in which the pyrolysis is carried out. In a preferred embodiment of the invention, the formed $CS_2$ and volatile impurities are essentially condensed in such part of the reactor, which is essentially free of carbon nitride material. Formed organic sulfide compounds such as ammonium sulfide (when employing ammonium rhodanide) can preferably be washed off the end product $C_3N_4$ with water. The reactor is not restricted in shape or material and can be of different metal grades, glass, ceramics etc. Two possible laboratory scale quartz tube reactors are shown in FIGS. 1a and 1b.

The invention accomplishes preparation of carbon nitride material comprising graphitic structure in desired molecular ratios. Preferably, such carbon nitride material has an atomic ratio of carbon to nitrogen of about 3:4.

Carbon nitride material is produced in particle form, but can be worked into powders, flakes, films, fibers, foams, foils, micro foils, granules, insulated wires, honey comb, dispersions, laminates, lumps, mesh, metallised films, non-woven fabrics, monofilament, rods, sheets, single crystals, spheres, tubes, wires, and for example sputtering/pulsed plasma arc-discharge/laser ablation targets. Normal powder processing methods such as mixing, tabletting and sintering techniques can be utilized in production.

EXAMPLES

The method of the invention for preparing carbon nitride material is described below, yet without restricting the invention to the examples given here. Synthetic carbon nitride material was identified using X-ray powder diffraction, infrared absorption, and reduction melting in a carrier gas (helium) flow with subsequent chromatographic separation. The elemental analyses were conducted by employing Perkin Elmer Series II CHNS/O Analyzer 2400.

Example 1

For obtaining carbon nitride $C_3N_4$, ammonium rhodanide in quantity of 10.00 g was taken, loaded into a reaction chamber, which was made of quartz glass and shaped as two connected vessels. The chamber was vacuumized to pressure of $10^{-4}$-$10^{-5}$ mmHg and sealed. The chamber was placed into an oven (Carbolite) and heated up to T=600° C., keeping the temperature gradient $T_{max}$=600° C., $T_{min}$=ambient temperature through the vessels. The following reaction was conducted for 12 hours:

Formed $CS_2$ and volatile impurities condensed in one of the vessels due to the existence of the temperature gradient. This vessel was removed. Ammonium sulfide $(NH_4)_2S$ dissolved readily in water, being thus readily removed by simple washing. As a result, graphitic carbon nitride $C_3N_4$ was obtained as a pale-brown powder, the yield of which was 20%. According to the X-ray analysis, the carbon nitride material possessed carbon-nitride bonding and structure similar as reported in the state of the art. The elemental analysis revealed the following product composition: $C_3N_{4.5}H_{0.9}$. No traces of sulfur or any other elements were present.

Example 2

For obtaining carbon nitride $C_3N_4$, ammonium rhodanide in quantity of 10.00 g was taken, loaded into a reaction chamber, which was made of quartz glass and shaped as two connected vessels. The chamber was evacuated to pressure of $10^{-3}$-$10^{-4}$ mmHg and sealed. The chamber was placed into an oven (Carbolite) and heated up to T=650° C., keeping the temperature gradient $T_{max}$=650° C., $T_{min}$=ambient temperature through the vessels. The following reaction was conducted for 12 hours:

Formed $CS_2$ and volatile impurities condensed in one of the vessels due to the existence of the temperature gradient. This vessel was removed. Ammonium sulfide $(NH_4)_2S$ dissolved readily in water, being thus readily removed by simple washing. As a result, graphitic carbon nitride $C_3N_4$ was obtained as a pale-brown powder, the yield of which was 17%. According to the X-ray analysis, the carbon nitride material possessed carbon-nitride bonding and structure similar as reported in the state of the art. The elemental analysis revealed the following product composition: $C_3N_{4.33}H_{0.87}$. No traces of sulfur or any other elements were present.

Example 3

For obtaining carbon nitride $C_3N_4$, ammonium rhodanide in quantity of 10.00 g was taken, loaded into a reaction chamber, which was made of quartz glass and shaped as two connected vessels. The chamber was evacuated to pressure of $10^{-4}$-$10^{-5}$ mmHg and sealed. The chamber was placed into an oven (Carbolite) and heated up to T=500° C., keeping the temperature gradient $T_{max}=500°$ C., $T_{min}=$ambient temperature through the vessels. The following reaction was conducted for 12 hours:

$$4NH_4CNS \rightarrow 2(NH_4)_2S + C_3N_4 + CS_2$$

Formed $CS_2$ and volatile impurities condensed in one of the vessels due to the existence of the temperature gradient. This vessel was removed. Ammonium sulfide $(NH_4)_2S$ dissolved readily in water, being thus readily removed by simple washing. As a result, graphitic carbon nitride $C_3N_4$ was obtained as a pale-brown powder, the yield of which was 14%. According to the X-ray analysis, the carbon nitride material possessed carbon-nitride bonding and structure similar as reported in the state of the art. The elemental analysis revealed the following product composition: $C_3N_{4.45}H_{0.9}$. No traces of sulfur or any other elements were present.

The invention claimed is:

1. A method for preparing carbon nitride material, comprising pyrolysis of a non-metallic rhodanide to give carbon nitride material, wherein the pyrolysis is carried out under vacuum.

2. The method according to claim 1, wherein the vacuum comprises a pressure of $10^{-1}$-$10^{-9}$ mmHg.

3. The method according to claim 1, wherein the non-metallic rhodanide is ammonium rhodanide.

4. The method according to claim 1, wherein the pyrolysis is carried out with a gradient of $T_{max} \leq 850°$ C., $T_{min} \leq$ ambient temperature.

5. The method according to claim 1, wherein the pyrolysis is carried out with a gradient of $T_{max} \leq 650°$ C., $T_{min} \leq$ ambient temperature.

6. The method according to claim 1, wherein the pyrolysis is carried out with a gradient of $T_{max} \leq 500°$ C., $T_{min} \leq$ ambient temperature.

7. The method according to claim 1, wherein the carbon nitride material is produced in a manner such that the produced carbon nitride material does not contain any traces of sulfur.

8. The method according to claim 1, wherein the carbon nitride material is produced in a manner such that the produced carbon nitride material does not contain any elements other than carbon, nitrogen, and hydrogen.

9. A method for preparing carbon nitride material, comprising pyrolysis of a non-metallic rhodanide to give carbon nitride material, wherein the pyrolysis is carried out under an inert gas atmosphere.

10. The method according to claim 6, wherein the inert gas atmosphere comprises nitrogen.

11. The method according to claim 9, wherein the inert gas atmosphere comprises argon.

12. The method according to claim 9, wherein the non-metallic rhodanide is ammonium rhodanide.

13. The method according to claim 9, wherein the pyrolysis is carried out with a gradient of $T_{max} \leq 850°$ C., $T_{min} \leq$ ambient temperature.

14. The method according to claim 9, wherein the pyrolysis is carried out with a gradient of $T_{max} \leq 650°$ C., $T_{min} \leq$ ambient temperature.

15. The method according to claim 9, wherein the pyrolysis is carried out with a gradient of $T_{max} \leq 500°$ C., $T_{min} \leq$ ambient temperature.

16. The method according to claim 9, wherein the carbon nitride material is produced in a manner such that the produced carbon nitride material does not contain any traces of sulfur.

17. The method according to claim 9, wherein the carbon nitride material is produced in a manner such that the produced carbon nitride material does not contain any elements other than carbon, nitrogen, and hydrogen.

18. The method according to claim 9, wherein the carbon nitride material comprises a graphitic structure.

19. The method according to claim 18, wherein the non-metallic rhodanide is ammonium rhodanide.

20. The method according to claim 18, wherein the pyrolysis is carried out with a gradient of $T_{max} \leq 850°$ C., $T_{min} \leq$ ambient temperature.

21. The method according to claim 18, wherein the pyrolysis is carried out with a gradient of $T_{max} \leq 650°$ C., $T_{min} \leq$ ambient temperature.

22. The method according to claim 18, wherein the pyrolysis is carried out with a gradient of $T_{max} \leq 500°$ C., $T_{min} \leq$ ambient temperature.

23. The method according to claim 18, wherein the carbon nitride material is produced in a manner such that the produced carbon nitride material does not contain any traces of sulfur.

24. The method according to claim 18, wherein the carbon nitride material is produced in a manner such that the produced carbon nitride material does not contain any elements other than carbon, nitrogen, and hydrogen.

* * * * *